(12) United States Patent
Etgen et al.

(10) Patent No.: US 9,798,028 B2
(45) Date of Patent: Oct. 24, 2017

(54) SYSTEM AND METHOD FOR SEISMIC ADAPTIVE OPTICS

(71) Applicants: John Theodore Etgen, Houston, TX (US); Gabriel Perez, Houston, TX (US); Min Zhou, Houston, TX (US)

(72) Inventors: John Theodore Etgen, Houston, TX (US); Gabriel Perez, Houston, TX (US); Min Zhou, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 482 days.

(21) Appl. No.: 14/502,225

(22) Filed: Sep. 30, 2014

(65) Prior Publication Data

US 2016/0377755 A1    Dec. 29, 2016

Related U.S. Application Data

(60) Provisional application No. 61/885,680, filed on Oct. 2, 2013.

(51) Int. Cl.
*G01V 1/30* (2006.01)
*G01V 1/36* (2006.01)

(52) U.S. Cl.
CPC ............... *G01V 1/36* (2013.01); *G01V 1/301* (2013.01); *G01V 2210/51* (2013.01); *G01V 2210/512* (2013.01); *G01V 2210/53* (2013.01)

(58) Field of Classification Search
CPC ....................................................... G01V 1/301
See application file for complete search history.

(56) References Cited

U.S. PATENT DOCUMENTS

| | | | |
|---|---|---|---|
| 2004/0117123 A1* | 6/2004 | Jing | G01V 1/28 702/16 |
| 2008/0247272 A1 | 10/2008 | Pan | |
| 2012/0215506 A1 | 8/2012 | Rickett et al. | |
| 2014/0293744 A1* | 10/2014 | Zhang | G01V 1/28 367/53 |

OTHER PUBLICATIONS

PCT Search Report dated Apr. 21, 2015.

\* cited by examiner

*Primary Examiner* — Bryan Bui
(74) *Attorney, Agent, or Firm* — KaRan Reed

(57) ABSTRACT

The instant invention is designed to provide an adaptive approach to removing short-period time/phase distortions within a downward-continuation process that is a key component of seismic migration algorithms. Using techniques analogous to residual statics corrections that are used in standard seismic processing, one inventive approach estimates and removes the effects of short wavelength velocity disruptions, thereby creating clearer seismic images of the subsurface of the earth. Additionally, the instant method will provide an updated velocity model that can be used to obtain further image improvement.

20 Claims, 4 Drawing Sheets

SYSTEM AND METHOD FOR SEISMIC ADAPTIVE OPTICS

CROSS REFERENCE TO RELATED APPLICATIONS

This application claims priority, under 35 U.S.C. §119(e), of Provisional Application No. 61/885,680, filed Oct. 2, 2013, incorporated herein by this reference.

TECHNICAL FIELD

This invention relates to the general subject of seismic exploration and surveillance and, in particular, to methods for acquiring seismic and other signals that are representative of the subsurface for purposes of seismic exploration and/or surveillance.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns or vibrators in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations, such as on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source location-receiver activation. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

Of particular interest for purposes of the instant application is obtaining accurate subsurface images from seismic data that have been acquired where there are rapidly spatially varying subsurface velocities. Rapid lateral velocity variations (as compared with the velocities in the surrounding layers) are regularly seen in some regions of the world. Of substantial economic value are exploration targets that are adjacent to or below salt structures, which are well known sources of velocity problems. Since salt structures are frequently exploration targets this is a problem that is encountered to one degree or another with some regularity. In such areas, migrating seismic data to image the salt dome and the surrounding/deeper layers using conventionally obtained velocities often produces an image where there are regions in the processed data that appear disrupted or distorted due to inaccurate velocities.

Conventional velocity estimates are obtained by having an interpreter pick (manually or with the help of autotrackers) the top of the velocity anomaly. In the case of a salt structure, after the top is picked the salt velocity is "flooded" below it and then the base of salt is interpreted/picked. Subsequent migration of the seismic data using the estimated top and bottom then provides an accurate image of the extent and thickness of the salt, and geological structures below the salt, so long as the picks are accurate. If they are not, the image below the salt can be distorted.

Thus, what is needed is a way to more accurately identify the onset of a velocity anomaly in the subsurface. Further, it would be desirable that the method requires less human intervention than has heretofore been the case.

As is well known in the seismic acquisition and processing arts, there has been a need for a system and method that provides a better way to migrate data that have been acquired over a subsurface where there are short-period velocity variations. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to one aspect of the instant invention, there is provided a system and method of seismic exploration that makes it possible to image subsurface structures in the presence of rapidly changing subsurface velocities.

Lateral velocity variation is always expected, but when the velocity changes take place rapidly, such can be disruptive to seismic wavefields and result in migrated seismic data that does not accurately reflect the subsurface structure. Conventional seismic velocity estimation techniques often fail to estimate rapidly varying velocity anomalies which can result in parts of the subsurface image appearing to be disrupted. Thus, and according to an embodiment of the invention, techniques that are analogous to those used in residual statics corrections in standard seismic processing are used to reduce the effect of short wavelength velocity disruptions. The resulting image will be much clearer than that previously available and will provide velocity model updates that may lead to further image improvement.

In simple terms, in an embodiment the instant method works inside a seismic migration algorithm by capturing waves that have been reconstructed into the subsurface by, for example, downward continuation or reverse-time propagation. The prestack wave field will be analyzed at locations where there might be an error in the velocity model. If the reconstructed wave field has rapidly spatially varying phase distortions when reconstructed, then there are likely velocity errors in the vicinity of the current datum. One way to correct for those errors according to the instant invention would be to use cross correlation to estimate local time shifts and then remove those time shifts by simply time shifting the wavefield to make it have spatially-smooth phase. In embodiments, this approach is similar in general concept to the seismic practice called "residual statics corrections" that is used to compensate prestack seismic data for near surface velocity variations. An important aspect of the instant invention is the recognition that it is possible to carry the procedure described above at any subsurface level where there are rapid variations in velocity.

Other embodiments and variations are certainly possible within the scope of the instant invention and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
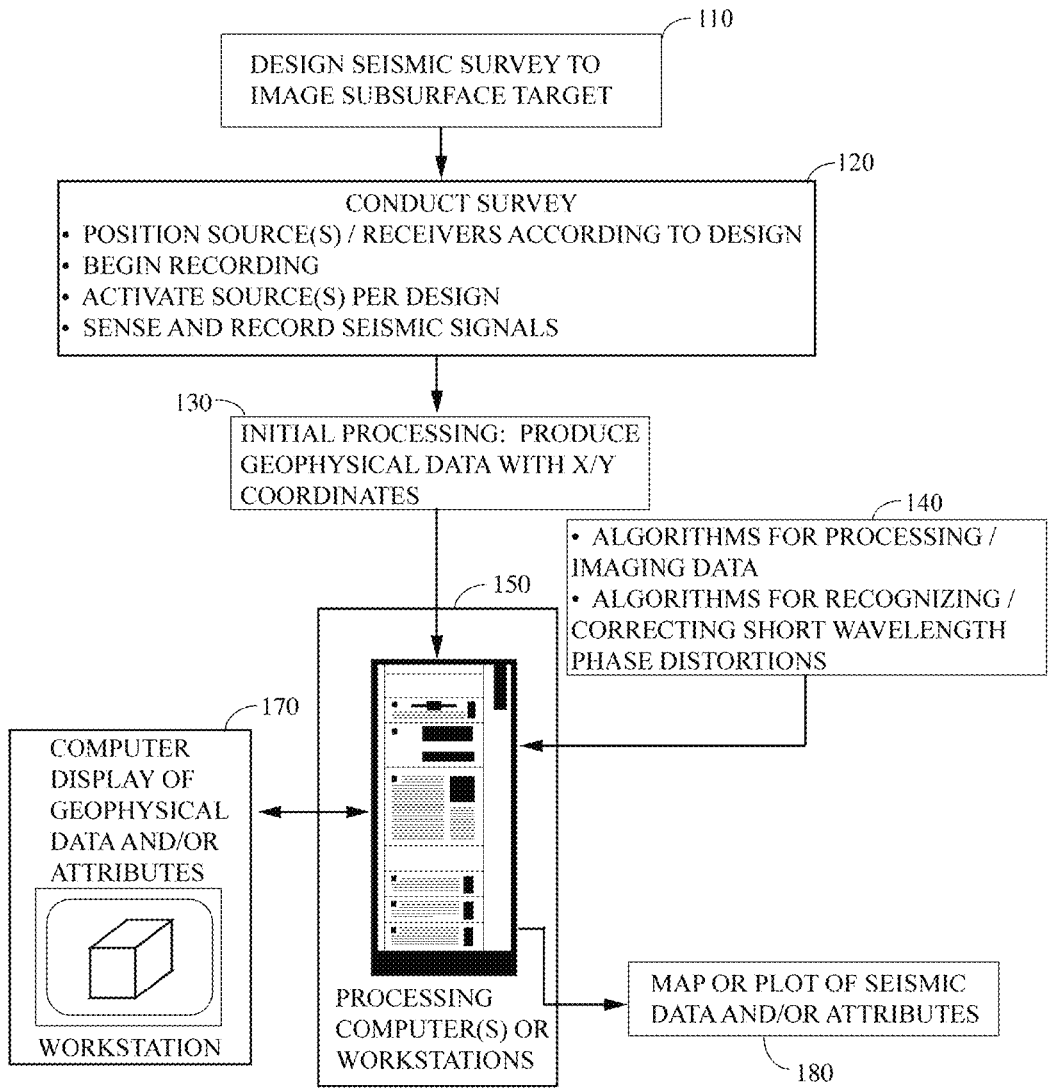
FIG. 1 illustrates the general processing environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment of the instant invention, there is provided a method of seismic processing that more readily accommodates subsurface velocity anomalies than has been available heretofore. More specifically, the instant invention is a system and method for improving images derived from seismic data (both transmission and reflection) using an adaptive approach that automatically recognizes and removes short-wavelength phase distortions from seismic data during conventional seismic migration calculations. One application would be to improve images of structures that are below complex velocity overburden, particularly overburden features that are below the surface of the Earth/deep in the subsurface and are difficult to characterize by other means. In addition to improving images in models obtained by other methods, it can serve as a component to an iterative process that automatically updates the velocity model leading to further image improvement.

Turning now to FIG. 1, this figure contains a general overview of the instant invention and its associated environment. As is indicated, a seismic survey will be designed 110 according to methods well known to those of ordinary skill in the art. The survey might be, for example, a VSP (vertical seismic profile), land survey, marine survey, or some combination. Those of ordinary skill in the art will understand how surveys are designed and especially how such might be done where the object is to image a particular subsurface target.

In the field, seismic data will be collected according to the survey design (box 120). This will typically involve positioning source and receivers at least approximately according to the design and recording source activations as is typically done. The recorded seismic waves (i.e., the seismic data) may (or may not) be subjected to some in-field processing before transmitting it on to a processing center where the bulk of the processing will typically take place.

Typically within a processing center some initial processing will be performed to associate each seismic recording with a surface or other location (box 130), although some aspects of this procedure might also have been performed in the field. In either case, a computer system 150, which might be a workstation, a server, a main frame, a parallel computer, a networked collection of computers or workstations, etc., will typically be engaged to process the data further in preparation for using it in exploration.

Next, the individual source or subarray activations will be identified and separated according to methods well known to those of ordinary skill in the art (e.g., via sparse inversion). Algorithms that do such a separation will typically be made available to a computer that is to utilize them via access to some amount of local or remote hard disk or other storage (item 140). Additional algorithms useful in the processing of seismic data will be similarly provided to the CPU 150 which might be any conventional or unconventional programmable computing device.

Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

Figure 2:
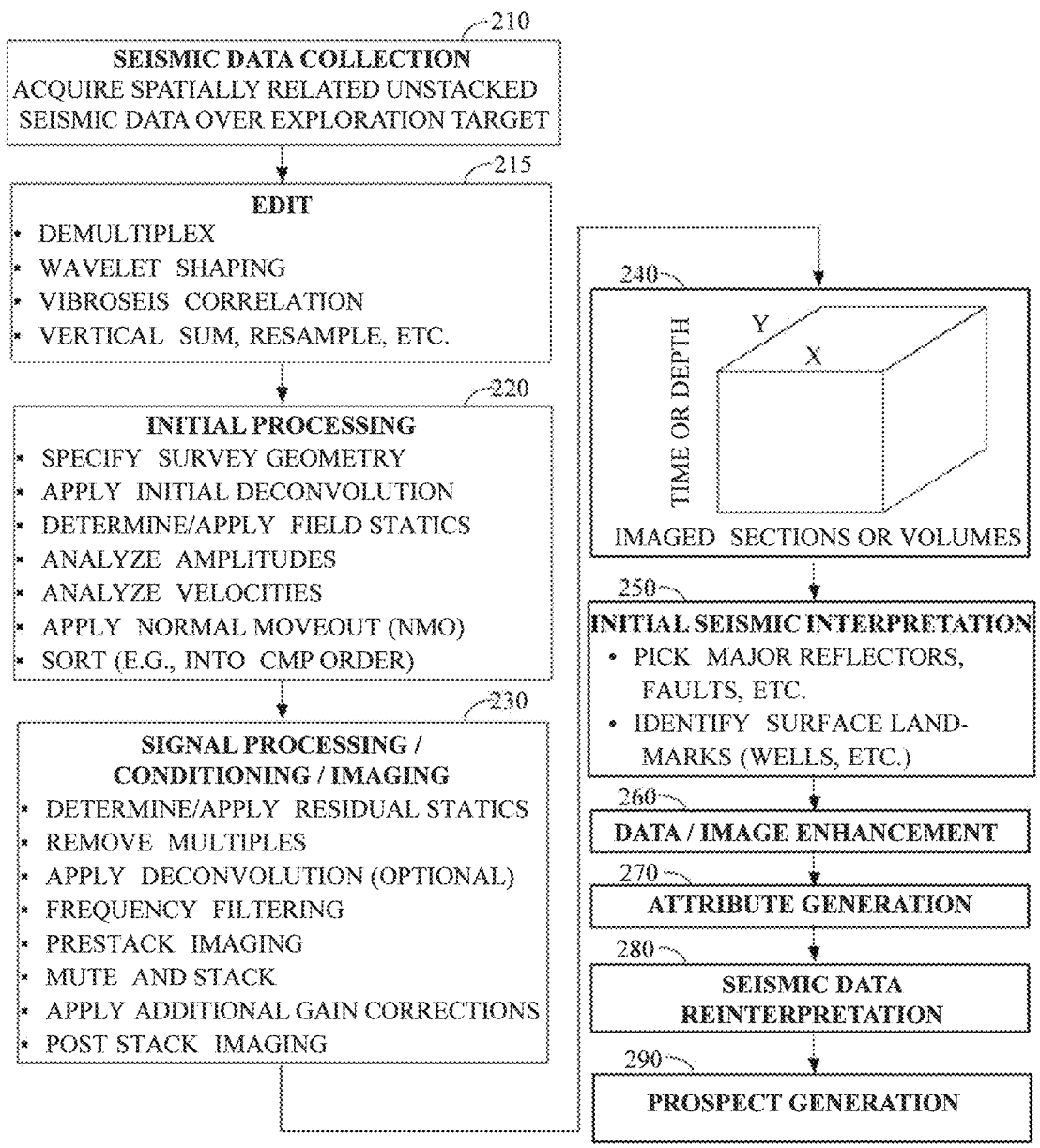
FIG. 2 contains an example processing sequence of the sort that might be utilized in connection with the instant invention.

FIG. 2 contains additional details of a typical seismic processing sequence suitable for use with the instant invention: seismic data collection 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290.

In many instances the instant invention would be made a part of the imaging component of box 230.

Figure 3:
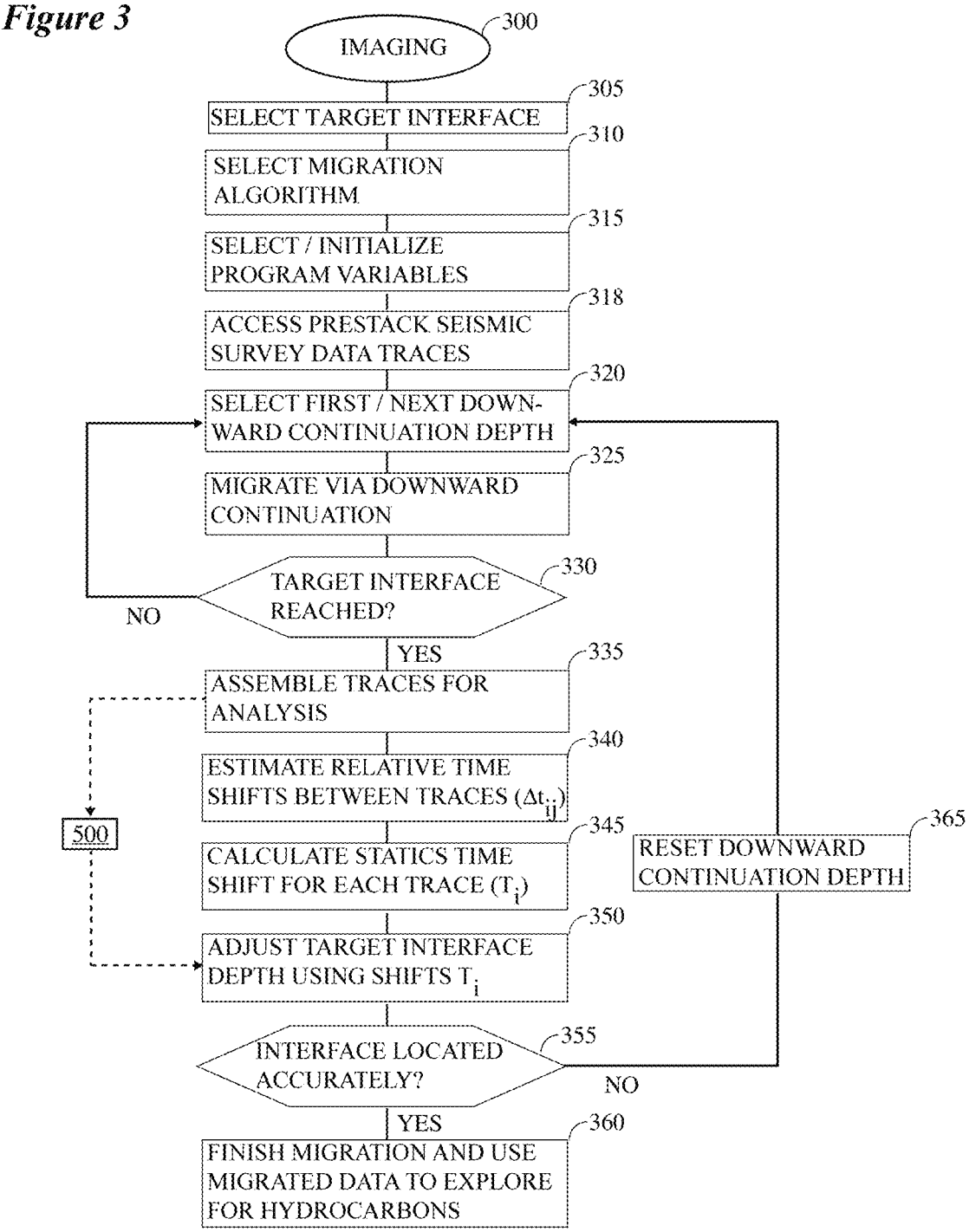
FIG. 3 contains an operating logic suitable for use with the instant invention.

Turning next to a more detailed discussion, as is generally indicated in the embodiment 300 of FIG. 3, an initial step would be to pick or otherwise select a target interface (box 305). In some embodiments this will be the top of the rock unit that appears to have an anomalous velocity. Note that this initial pick may need to be adjusted in a subsequent iteration (discussed below), but it would be useful to have the pick be as accurate as possible from the outset. Additionally, in some instances the target interface may be discontinuous laterally and/or include some amount of dip and curvature.

In most cases the target interface will be a 3D surface that is proximate to an interface in the subsurface where there is a substantial change in velocity. As an example, the target interface might be proximate to the top of a salt body, near a magmatic intrusion, etc. In some cases the target interface might be picked along a 2D line but in most cases of interest it will be a 3D surface or combination of 3D surfaces (e.g., the top and bottom of a salt body). In an embodiment, the target interface will be known in some sense, via, by way of example, well logs, seismic data picks, etc.

Next, in an embodiment a migration algorithm will be selected (box 310). The particular migration algorithm selected should be one that can operate on prestack seismic data and that can produce a downward continued or backward time continued wavefield at points in the subsurface proximate to the target interface. Among the sorts of prestack migration algorithms that can do this include, without limitation, reverse time migration, phase shift migration, Kirchhoff migration, etc.

Next, in some embodiments program variables will be initialized, memory and/or disk space allocated, etc., according to methods well known to those of ordinary skill in the art (box 315). In some cases, the parameters that are specified at this point might include the depth step size to be used in performing the downward continuation migration that follows.

In some variations, the instant invention will next access prestack seismic traces from a seismic survey that has been conducted above or proximate to the subsurface feature that corresponds to the target interface (box 318). Methods of collecting and processing such seismic data are well known to those of ordinary skill in the art.

Next, in the embodiment of FIG. 3 the downward continuation process will begin. First the interval to downward-continue over will be chosen (box 320), then the wavefield will be downward-continued according to the properties of that interval (box 325). Typically, this process begins at the surface of the earth and moves progressively deeper, but other variations are possible. In any case, in this embodiment typically a previously specified depth increment will be used to control the downward continuation process. In some cases, the "next" migration depth of box 320 will be the previous depth, incremented by the depth increment.

Next, in some embodiments, a test will be made to determine whether or not the downward continuation has reached a depth proximate to the target interface (decision item 330). If not, (the "NO" branch) the embodiment of FIG. 3 will continue by increasing the current depth (box 320) and continuing the downward continuation process according to methods well known to those of ordinary skill in the art.

In the alternative, though, if the current downward continuation depth is proximate to the target interface (the "YES" branch of decision item 330) this embodiment will proceed to estimate the depth to the target interface at each trace location based on the current wavefield as discussed below. Note that in an embodiment the iterative process should be terminated (the "YES" branch of decision item 330) while the current depth is below the target interface, however, in an alternative embodiment, the process could also be terminated above the target interface. The "YES" branch is taken if the current depth is proximate to (above or below) the target interface. Of course, the closer to the target interface, the better the outcome should be.

Next, and in an embodiment, the downward-continued traces are assembled (box 335) and the short wavelength time differentials that are exhibited by the current version of the wavefield will be calculated (box 340). According to one aspect of the invention, to the extent that there are time (or phase) differences between traces, that is indicative of an inaccurate target horizon pick. Thus, given the relative time differentials, the target horizon may be moved up or down locally, thereby creating a revised estimate of the depth location of the target interface.

One method of obtaining these time shifts is via the use of residual statics correction algorithms, as that term is well known in the seismic arts. That is, conventional residual statics corrections are designed to correct timing irregularities that arise from near-surface velocity or other variations. In some sense, downward continuation may be thought of as changing the problem of picking the upper surface of a deeply situated velocity anomaly (either a transition to higher velocity or to a lower velocity) to a "near surface" velocity problem by mathematically positioning the receivers "close" to the surface of the anomaly.

In some embodiments and continuing with the example of FIG. 3, the current status of the downward continued wavefield will be examined to determine if there are rapidly spatially varying relative time shifts between the traces. In some cases, gathers of seismic traces will be assembled (box 335) and the relative time shifts between the traces (box 340) in the gather will be computed. In some cases the comparison will be between traces in receiver gathers (as that term is known and understood in the art) but other variations are certainly possible (e.g., bins might be useful in some cases). More generally, a comparison will need to be made between neighboring traces in the downward continued wavefield. The wavefield might potentially have been calculated from any sort of gather or collection of traces including, without limitation, a shot record, a receiver gather, a synthesized plane wave gather, a zero-offset gather, etc.

Figure 4:
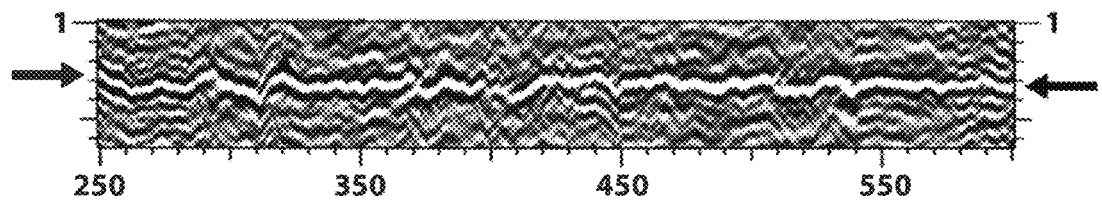
FIG. 4 contains an illustrative display of cross correlations between downward continued seismic traces that illustrate short wavelength time variations.

The relative time shifts might be calculated in many different ways, but one useful approach would be to use cross correlations between the traces to establish the relative time shifts. FIG. 4 shows an example of what a cross correlation of the downward continued wave field might look like in an instance where the top of the velocity anomaly has not been picked accurately. In this case, it is clear that the central peak of the cross correlation (indicated by the arrows at each end of the cross correlation plot) has time offsets (phase distortions) that vary from trace to trace, thereby indicating an inaccurate pick. The values of the relative time shifts between pairs of traces can be extracted from cross correlation calculations such as these according to methods well known to those of ordinary skill in the art.

Next, in an embodiment the statics time shifts, $\Delta t_i$, i=1, N associated with each of the N traces in the analysis will be estimated (box 345). Given the relative time shift that has been calculated between each trace pair in the group, i.e., $T_{jk}$, j=1, N, k=1, N, with N being the number of traces in the analysis, an equation such as the following could be solved for the $\Delta t_i$ to give estimates of the statics time shifts that are associated with each trace:

$$\begin{bmatrix} 1 & -1 & \cdots & 0 & 0 \\ 1 & 0 & -1 & \cdots & 0 \\ \vdots & & & & \vdots \\ 0 & 0 & \cdots & 1 & -1 \end{bmatrix} \begin{bmatrix} \Delta t_1 \\ \Delta t_2 \\ \vdots \\ \Delta t_N \end{bmatrix} = \begin{bmatrix} T_{12} \\ T_{13} \\ \vdots \\ T_{N-1,N} \end{bmatrix}$$

Solving for the $\Delta t$ vector can be done according to methods well known to those of ordinary skill in the art. In some cases, whitening might be added to the matrix or constraints (e.g., the $\Delta t_i$ must sum to zero) might be imposed in order to produce a unique best-fit solution to this over-determined system. In the form presented above, this system of equations may not be exactly or uniquely invertible, hence the practice of adding additional constraints, whitening, solving in a least-squares or L1-norm best-fit sense, etc.

After the statics solution (345) has been obtained and a time shift associated with each trace has been determined, that time shift can be used to correct the depth of the target interface at the location of that trace, either moving it up or down according to the sign of the calculated statics time shift (box 350). For purposes of the instant disclosure, these individual trace time shifts obtained via a statics computation will be known as statics times. The surface location of each downward continued trace will provide a location (e.g., (x,y) coordinates) where the target interface is to be corrected. Of course, in some cases the time shifts (and associated depth shifts if the target horizon is defined in depth) might be filtered, decimated, etc., before being used to adjust the target. Other variations are certainly possible and well within the abilities of one of ordinary skill in the art.

Next, in some embodiments a determination will be made as to whether or not the adjusted target interface has been determined with sufficient accuracy (decision item 355). This might be done in many ways. For example, the sizes of the $\Delta t_i$ might be reviewed to see if the corrections are approaching "zero" in some sense. In other instances, the current estimate of the depth of the target interface might be compared with the previous estimate, etc.

If the target interface has been determined with sufficient accuracy (the "YES" branch of decision item 355), in many cases a prestack migration will be performed on the subject seismic data, with the migrated seismic traces that are produced by that process being suitable for use in geophysical exploration for and/or production of hydrocarbons. In some instances, box 360 might obtain a migrated seismic section by continuing the downward continuation/migration process until some predetermined maximum depth is reached. In other instances, the now-improved subsurface velocity model (including the adjusted target interface depth) will be used as input to some other sort of imaging algorithm, with the output, again, being designed to be used in exploration/production.

If the interface has not been located with sufficient accuracy, though (the "NO" branch of decision item 355) the instant invention may reset the downward continuation depth (box 365) and once again downward continue the wavefield data from that point down to the revised target interface from box 350. In some instances, the downward continuation depth will be some point above the target interface, in which case a previously saved wavefield at a shallower depth could then be continued down into the revised velocity model. In other cases, though, the depth might be reset to the surface. As before, once the target interface is reached and further adjusted (box 350), a determination will be made as to whether or not there would be something to be gained by repeating this process (the "NO" branch of decision item 355). Those of ordinary skill in the art will readily appreciate how the instant method might be repeated several times until the target interface has been located with sufficient accuracy.

Of course, those of ordinary skill in the art will recognize that the target interface is unlikely to be flat (other than, perhaps, initially) and that interface will be reached at depths depending on where the seismic traces are located with respect to the interface. However, as long as the target interface is locally smooth one would be able to measure the residual statics on the downward continued wavefield. In cases where the target interface is rough, the wavefield can be captured as it passes the target interface and then subjected to an elevation statics analysis to undo the effect of the known roughness of the target interface. After this process, residual statics can be applied as discussed earlier.

It should be noted that residual statics algorithms have been discussed as one method of adjusting the depth to the target interface based on perceived disruptions of the wavefield proximate to that interface. More generally, though, any temporal adjustment scheme that utilizes relative time shifts that are calculated from a comparison of trace pairs that have been obtained by downward continuation might be used. The instant invention could use residual statics calculated according to the method indicated herein (which is an example of solving for statics shifts as a solution of a general linear inverse problem) or via methods such as simulated annealing, surface consistent statics, genetic algorithms, etc. Those of ordinary skill in the art will recognize that such approaches and others are frequently used in connection with estimating surface statics but have not heretofore been applied to target interface depth estimation as is taught herein. As such and for purposes of the instant disclosure, the term "residual statics" will be broadly interpreted to mean any method of systematically correcting for and, in some embodiments, minimizing according to some norm (e.g., L1, least squares, etc.) relatively short wavelength timing differences between traces.

Figure 5:
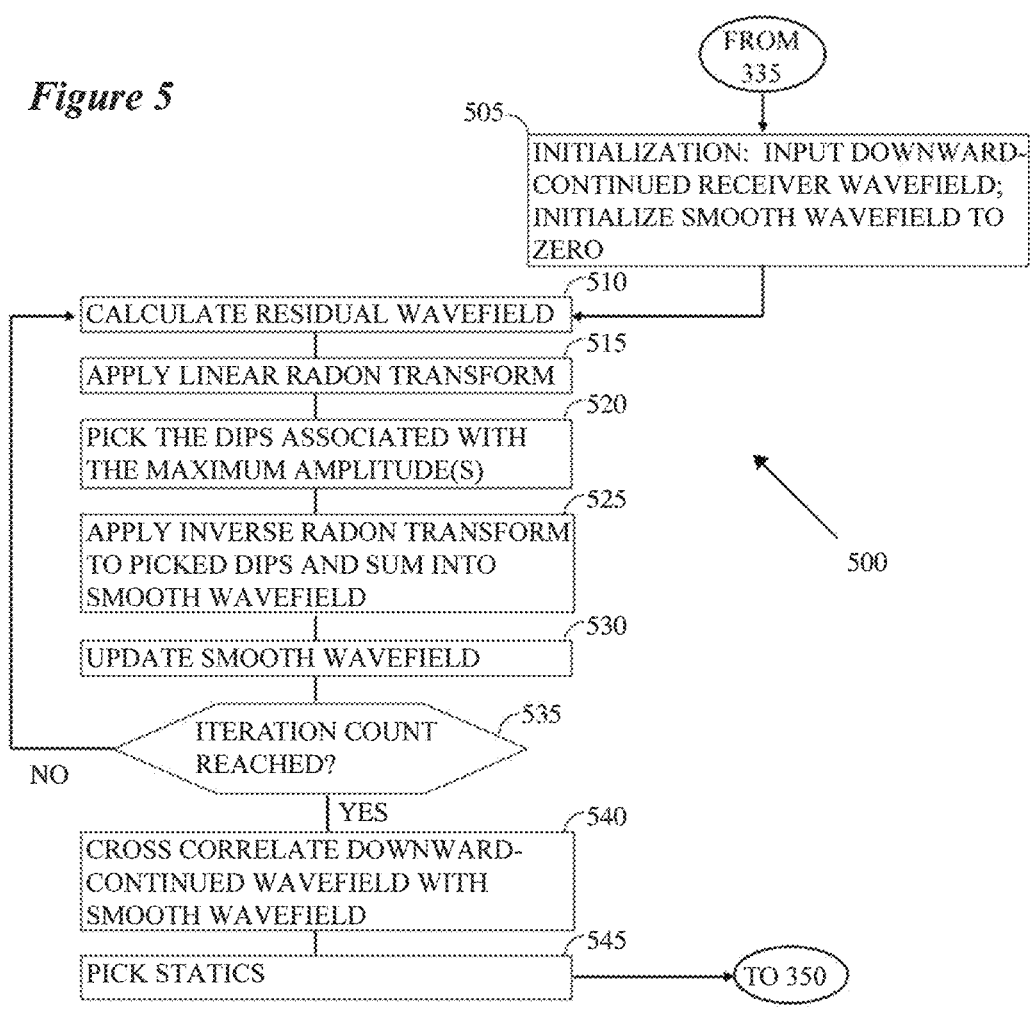
FIG. 5 shows an alternative operating logic for calculating the statics time shifts 345 in FIG. 3.

Those of ordinary skill in the art will also appreciate that there are alternative methods of performing boxes 340 and 345. In an embodiment 500 shown in FIG. 5, estimating time shifts 340 and calculating statics 345 may be performed by a method that first estimates a smooth downward-continued wavefield and then calculates statics by comparing the original with the smooth downward-continued wavefield. The smooth downward-continued wavefield could be calculated in many different ways, but one embodiment begins with a zeroed buffer (box 505) and successively increments it according to boxes 510 through 530. More particularly, in an initialization (box 505) the downward-continued wavefield is organized into a format suitable for further processing from the assembled downward-continued traces 335, and the smooth wavefield is initialized to all zeroes. Next, a residual wavefield is calculated 510 by subtracting the current smooth wavefield from the downward-continued wavefield. Next the residual wavefield is transformed 515 to the linear radon domain. Then, the amplitudes of the radon-transformed residual wavefield are calculated and a dip, intercept, and amplitude associated with the maximum value(s) are picked 520. In this embodiment, all elements of the radon-transformed wavefield not picked are set to zero, and the resulting sparse wavefield in the radon domain is transformed back to the original domain and summed into the smooth wavefield being accumulated 525 to create an updated smooth wavefield 530. Additional iterations of updating the smooth wavefield will be performed until a predetermined number of iterations is reached 535. Once the final smooth wavefield has been calculated, a trace by trace cross correlation between the downward-continued wavefield and the smooth wavefield will be calculated 540. Then the cross-correlation volumes from different shots will be stacked to improve the signal to noise ratio (not shown). Finally, the instant embodiment calculates the short-wavelength statics of the downward-continued wavefield by picking 545 the times associated with the peak values in the trace cross correlations.

Those of ordinary skill in the art will appreciate that there are many other possible methods for updating the smooth wavefield (boxes 515, 520, 525, and 530), for example by Projection Onto Convex Sets (POCS) (Ray Abma and Nurul Kabir, 2006: 3D interpolation of irregular data with a POCS algorithm, GEOPHYSICS, VOL. 71, NO. 6, P. E91-E97), or by Generalized Matching Pursuit (S. G. Mallat and Z. Zhang, Matching Pursuits with Time-Frequency Dictionaries, IEEE Transactions on Signal Processing, December 1993, pp. 3397-3415), the disclosures of which are fully incorporated by reference herein. Similarly, other criteria instead of iteration count may be used to determine when the smooth wavefield has been sufficiently updated 535.

Although the instant discussion has focused on the use of pre-stack migration and operations on unstacked seismic data, that was done for purposes of illustration and not out of any desire to so limit the scope of the instant invention. It should be noted that in some embodiments, a post stack migration can be used. In embodiments, the process includes the computation of a downward continued wavefield that has passed through the presumed disrupting interface and some means of capturing a wavefield that has been continued down to or datumed to a surface that is proximate to the target interface. As such, when the term "seismic trace" is used herein, that term should be broadly construed to include both unstacked and stacked seismic traces.

In the foregoing, much of the discussion has been discussed largely in terms of conventional seismic surveys, but that was done for purposes of illustration only and not out of an intent to limit the application of the instant invention to only those sorts of surveys. Those of ordinary skill in the art will understand how the embodiments presented supra could readily be applied, by way of example, to 2D, 3D, 4D, etc., surveys, down hole surveys, or any combination of same.

It should be noted that operations on seismic traces that are performed in the depth domain can also be performed in the time domain. Thus, in some instances the target interface of the instant invention might be specified in terms of depth (e.g., a collection of (x,y,z) triplets) or in time (e.g., (x,y,t) triplets). Thus, when it is said herein that the target interface is adjusted in depth, it should be understood that such adjustment could just as easily have been made in time. As such, in the claims that follow if it is said that an adjustment in the target interface is made in depth, that language should also be understood to apply with equal force to a corresponding adjustment in time.

Additionally, it should be noted that when reference is made to an activity such as selecting (or specifying, picking, etc.) a target interface or some other subsurface feature, that activity should be understood to mean the process of using seismic data and/or another source of data that interrogates the subsurface (e.g., well logs, gravity or magnetic surveys, cross hole surveys, VSP surveys, regional geology, local stratigraphy, etc.) to form a representation of some aspect of the volume of earth that is imaged by the source of the data. Typically the resulting representation will be defined in terms of locations on the surface of the earth and corresponding depths within the earth (or seismic wave travel times). The selection process involves some amount of computer-assisted analysis of, and/or interaction with, the subsurface data. Various modes of data visualization might be used as part of this process (e.g., the data might be viewed using a computer display, printed on paper or film, etc.). Computer processing of the data to transform it and to increase its information content relative to the target, statistical or other analyses of the data, etc., is routinely performed on some kinds of data as part of the selection process. In some cases, the data will be highly processed before being used to select a target and in other cases the selection might be made using minimally processed field records.

Further, it should be noted that when the term "access" is used in connection with data acquired by a seismic survey that term should be understood to mean reading via a computer seismic data that is stored on a volatile or non-volatile medium. The seismic data acquired during a survey contains signals that are representative of the configuration of the earth proximate to the survey and may or may not have been previously treated with some number of computer algorithms to improve its usability at the time it is accessed. In the event that the term "access" is applied to synthetic or generated seismic data, that usage should be understood to mean that the data so-accessed has been created based on the interaction of computer algorithms that are programmed to utilize the physics of transmission, reflection, diffraction, etc., with a hypothetical model of the earth proximate to some area of interest.

Additionally, when it is said that processed or unprocessed seismic data might be used in seismic exploration, that act should be broadly interpreted to mean that seismic data (fully processed, minimally processed, or unprocessed) are used to provide images, plots, reports, or other visualizations that are representative of the configuration or properties of the subsurface of the earth. In other words, the seismic source has created seismic waves that are transmitted into and through the subsurface. Passage of the seismic waves through the subsurface modifies them depending on the properties of the media through which they pass. The recorded seismic waves are further transformed from P waves and/or S waves into electrical impulses that are recorded in the field. Subsequent seismic processing further transforms the electrical signals into the images, plots, reports, etc., that are used to make exploration or production drilling decisions or other sorts of decisions with real-world impact.

When it is said herein that a procedure or step is expressed in terms of or utilizes an "algorithm", that term should be understood to mean that the identified procedure or step (e.g., a "migration algorithm") is to be performed by software running within a computer, with the output from such algorithm being based on the value of one or more user or programmer specified parameters.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

While the inventive device has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration of a region of the subsurface of the earth containing structural or stratigraphic features conducive to the presence, migration, or accumulation of hydrocarbons, wherein is provided a plurality of seismic traces collected in a seismic survey conducted proximate to the region of the subsurface of the earth, the method comprising the steps of:
   (a) specifying a target interface, said target interface comprising a plurality of locations above the region of the subsurface of the earth and a plurality of associated depths;
   (b) within a computer,
      (i) accessing said plurality of seismic traces;
      (ii) successively applying a downward continuation algorithm to the plurality of seismic traces until an algorithmic depth proximate to said target interface is reached, thereby obtaining an estimate of a seismic wavefield at said algorithmic depth;
      (iii) using a residual statics algorithm and said estimate of a seismic wavefield at said algorithmic depth to determine a statics time shift for each of said plurality of seismic traces;
      (iv) using at least one of said determined statics time shifts to adjust at least one of said plurality of depths associated with said target interface, thereby creating an adjusted target interface; and,
      (v) migrating at least a portion of said seismic survey using said adjusted target interface, thereby imaging at least a portion of the subsurface of the earth; and,
   (c) using said imaged at least a portion of the subsurface of the earth in exploration for hydrocarbons within the region of the subsurface of the earth.

2. The method according to claim 1, wherein said estimate of a seismic wavefield of step (b)(ii) comprises a plurality of downward continued seismic traces, and wherein step (b)(iii) comprises the steps of,
   (1) selecting two or more pairs of said plurality of downward continued seismic traces,
   (2) for each of said selected two or more pairs of downward continued seismic traces, calculating a cross correlation between the downward continued seismic traces comprising said pair,
   (3) using said calculated cross correlation between each of said selected two or more pairs of downward continued seismic traces to obtain a relative time shift associated with each such cross correlation, thereby calculating two or more relative time shifts,
(4) using a residual statics algorithm and said at least two or more relative time shifts to determine a statics time shift associated with at least a portion of said plurality of downward continued seismic traces.

3. The method according to claim 2, wherein step (4) comprises the step of:
(i) determining a statics time shift associated with at least a portion of said plurality of downward continued seismic traces by solving the equation $$\begin{bmatrix} 1 & -1 & \cdots & 0 & 0 \\ 1 & 0 & -1 & \cdots & 0 \\ \vdots & & & & \vdots \\ 0 & 0 & \cdots & 1 & -1 \end{bmatrix} \begin{bmatrix} \Delta t_1 \\ \Delta t_2 \\ \vdots \\ \Delta t_N \end{bmatrix} = \begin{bmatrix} T_{12} \\ T_{13} \\ \vdots \\ T_{N-1,N} \end{bmatrix}$$

for $\Delta t_i$, i=1, N,
where $\Delta t_i$ is said statics time shift associated with an ith one of said plurality of downward continued seismic traces,
where N is a number of said at least a portion of said plurality of downward continued seismic traces, and,
where $T_{kj}$ is said relative time shift between a kth one of said plurality of downward continued seismic traces and a jth one of said plurality of downward continued seismic traces.

4. The method according to claim 1, wherein steps (ii) through (iv) are performed a plurality of times, with said adjusted target interface replacing said target interface after a first performance of steps (ii) through (iv).

5. The method according to claim 1, wherein the seismic survey is selected from the group consisting of a 2D seismic survey, a 3D seismic survey, and a 4D seismic survey.

6. The method according to claim 1, wherein the seismic survey is selected from the group consisting of a marine seismic survey and a land seismic survey.

7. The method according to claim 1, wherein each of said plurality of seismic traces is an unstacked seismic trace.

8. A computerized method of imaging an exploration target within the subsurface of the earth, comprising the steps of
(a) specifying a target interface, said target interface comprising a plurality of locations and a plurality of associated depths within the subsurface of the earth;
(b) within a computer,
(b1) accessing a plurality of seismic traces collected proximate to the exploration target;
(b2) successively applying a downward continuation algorithm to the accessed plurality of seismic traces until an algorithmic depth proximate to said target interface is reached, thereby obtaining a plurality of downward continued seismic traces at said algorithmic depth;
(b3) using said plurality of downward continued seismic traces to determine a statics time shift for each of said plurality of downward continued seismic traces;
(b4) using any of said statics time shifts to adjust at least one depth of said plurality of depths associated with said target interface, thereby creating an adjusted target interface;
(c) using said adjusted target interface to obtain an image of said exploration target, thereby imaging said exploration target; and,
(d) using said image of said exploration target in exploration for hydrocarbons proximate to said exploration target.

9. The method according to claim 8 wherein step (c) comprises the step of:
(c1) using said adjusted target interface to perform a migration of at least a portion of said plurality of seismic traces, thereby imaging at least a portion of said exploration target, and,
(c2) using said imaged at least a portion of said exploration target to explore for hydrocarbons within the region of the subsurface of the earth.

10. The method according to claim 9, wherein the seismic survey is selected from the group consisting of a 2D seismic survey, a 3D seismic survey, and a 4D seismic survey.

11. The method according to claim 9, wherein the seismic survey is selected from the group consisting of a marine seismic survey and a land seismic survey.

12. The method according to claim 9, wherein each of said plurality of seismic traces is an unstacked seismic trace.

13. The method according to claim 8, wherein steps (a) and (b) are performed a plurality of times for a plurality of different target interfaces, thereby producing a plurality of different adjusted target interfaces, and wherein step (c) comprises the step of:
(c1) using said plurality of different adjusted target interfaces to obtain an image of said exploration target, thereby imaging said exploration target.

14. The method according to claim 8, wherein steps (b3) and (b4) comprise the steps of,
(i) selecting two or more pairs of said plurality of downward continued seismic traces,
(ii) for each of said selected two or more pairs of downward continued seismic traces, calculating a cross correlation between the downward continued seismic traces comprising said pair,
(iii) using said calculated cross correlation between each of said two or more pairs to obtain a relative time shift, thereby calculating two or more relative time shifts,
(iv) using said calculated two or more relative time shifts to determine a statics time shift associated with at least a portion of said plurality of downward continued seismic traces, and,
(v) using at least one of said determined statics time shifts to adjust one of said plurality of depths associated with said target interface, thereby creating an adjusted target interface.

15. The method according to claim 14, wherein step (iv) comprises the step of:
(i) determining a statics time shift associated with at least a portion of said plurality of downward continued seismic traces by obtaining a solution of $$\begin{bmatrix} 1 & -1 & \cdots & 0 & 0 \\ 1 & 0 & -1 & \cdots & 0 \\ \vdots & & & & \vdots \\ 0 & 0 & \cdots & 1 & -1 \end{bmatrix} \begin{bmatrix} \Delta t_1 \\ \Delta t_2 \\ \vdots \\ \Delta t_N \end{bmatrix} = \begin{bmatrix} T_{12} \\ T_{13} \\ \vdots \\ T_{N-1,N} \end{bmatrix}$$

for $\Delta t_i$, i=1, N,
where $\Delta t_i$ is said statics time shift associated with an ith one of said plurality of downward continued seismic traces,
where N is a number of said at least a portion of said plurality of downward continued seismic traces, and, where $T_{kj}$ is said relative time shift between a kth one of said plurality of downward continued seismic traces and a jth one of said plurality of downward continued seismic traces.

16. The method according to claim 8, wherein steps (b2) through (b4) are performed a plurality of times, with said adjusted target interface replacing said target interface after a first performance of steps (b2) through (b4).

17. A method of seismic exploration of a subsurface target, comprising the steps of
 (a) accessing a plurality of seismic traces collected proximate to said subsurface target, wherein said plurality of seismic traces have been processed by a method comprising the steps of:
  (a1) specifying a target interface, said target interface comprising a plurality of locations proximate to said subsurface target and a plurality of associated depths;
  (a2) accessing said plurality of seismic traces collected proximate to said subsurface target;
  (a3) successively applying a downward continuation algorithm to said plurality of seismic traces until an algorithmic depth proximate to said target interface is reached, thereby obtaining an estimate of a seismic wavefield at said algorithmic depth;
  (a4) using a residual statics algorithm to determine a statics time shift for each of said plurality of seismic traces;
  (a5) using at least one of said determined statics time shifts to adjust one of said plurality of depths associated with said target interface, thereby creating an adjusted target interface; and,
  (a6) performing a migration on said plurality of seismic traces, thereby producing said plurality of processed seismic traces;
 (b) using at least a portion of said accessed plurality of processed seismic traces to explore for hydrocarbons proximate to said subsurface target.

18. A method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, the method comprising the steps of:
 (a) specifying a target interface, said target interface comprising a plurality of locations and a plurality of associated depths;
 (b) accessing at least a portion of the plurality of seismic traces;
 (c) accessing a downward continued wavefield calculated by applying a downward continuation algorithm to the accessed seismic traces until an algorithmic depth proximate to said target interface is reached, thereby obtaining an estimate of a seismic wavefield at said algorithmic depth;
 (d) accessing an estimate of a smooth downward-continued wave field calculated from said accessed seismic traces to said algorithmic depth proximate to said target interface;
 (e) using said smooth downward continued wavefield and said downward continued wavefield to obtain an estimate of a residual wavefield;
 (f) performing a radon transformation of said residual wavefield;
 (g) using said radon transformation of said residual wavefield to pick at least one dip;
 (h) using said at least one picked dip to calculate an inverse radon transformation of said residual wavefield;
 (i) combining said inverse radon transformation of said residual wavefield and said smooth downward continued wavefield to produce an updated smooth downward continued wavefield;
 (j) performing steps (e) through (i) at least twice, with said updated smooth downward continued wavefield replacing said smooth downward continued wavefield each time steps (e) through (i) are repeated;
 (k) using said updated smooth downward continued wavefield and said downward continued wavefield to determine a statics time shift for each of said accessed seismic traces;
 (l) adjusting at least one of said plurality of depths associated with said target interface using at least one of said determined statics time shifts, thereby creating an adjusted target interface;
 (m) migrating said accessed seismic traces using said adjusted target interface; and,
 (n) using said migrated accessed seismic traces in exploration for hydrocarbons within the region of the subsurface of the earth.

19. The method according to claim 18, wherein step (i) comprises summing together said inverse radon transformation of said residual wavefield and said smooth downward continued wavefield to produce an updated smooth downward continued wavefield.

20. The method according to claim 18, wherein step (k) comprises cross correlating said updated smooth downward continued wavefield and said downward continued wavefield to determine a statics time shift for each of said accessed seismic traces.

* * * * *